United States Patent
Chen

(10) Patent No.: US 9,579,709 B2
(45) Date of Patent: *Feb. 28, 2017

(54) METHOD FOR MANUFACTURING BICYCLE FRONT FORK HAVING WHEEL CLAMPING BASE

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

( * ) Notice: Subject to any disclaimer, the term of this patent is extended or adjusted under 35 U.S.C. 154(b) by 126 days.

This patent is subject to a terminal disclaimer.

(21) Appl. No.: 14/663,579

(22) Filed: Mar. 20, 2015

(65) Prior Publication Data

US 2016/0271680 A1 Sep. 22, 2016

(51) Int. Cl.
 B21D 53/86 (2006.01)
 B21D 19/00 (2006.01)
 (Continued)

(52) U.S. Cl.
 CPC ............ B21D 53/86 (2013.01); B21C 23/142 (2013.01); B21J 5/002 (2013.01); B21K 1/74 (2013.01); B23P 15/00 (2013.01); B62K 21/02 (2013.01); *Y10T 29/49616* (2015.01); *Y10T 29/49622* (2015.01)

(58) Field of Classification Search
 CPC .......... B21D 53/86; B21D 7/00; B21D 19/00;
 B21D 41/04; B21K 1/74; B62K 21/02;
 B62K 21/04; B21C 37/15; B21C 23/10;
 B21C 23/01; B21J 5/025; B21J 5/02;
 B21J 5/002;
 (Continued)

(56) References Cited

U.S. PATENT DOCUMENTS 609,937 A * 8/1898 Kelly ..................... B62K 21/04
 280/280
2,435,448 A * 2/1948 Kraeft .................. B23K 1/0008
 228/154
 (Continued)

FOREIGN PATENT DOCUMENTS

EP 0086480 A2 * 8/1983 ........... B21D 35/006
EP 2230165 A2 9/2010
 (Continued)

*Primary Examiner* — Essama Omgba
(74) *Attorney, Agent, or Firm* — Rosenberg, Klein & Lee

(57) ABSTRACT

A method for manufacturing a bicycle front fork having a wheel clamping base. The method includes the steps of extruding an aluminum alloy substrate having three rectangular bars, wherein the two of the rectangular bars have assembling segments; cutting the substrate for a blank and placing it into a mold for forging the three rectangular bars into three round bars; placing the blank into another mold for extruding and punching the three round bars to have guide holes; drilling the round bars along the guide holes to form three round tubes; flattening and shrinking openings of two of the three round tubes; molding the assembling segments; downwardly bending the two round tubes having the assembling segments into two fork tubes of a bicycle front fork; punching the assembling segments into locking connection portions for a clamping base of the bicycle front fork.

10 Claims, 10 Drawing Sheets

(51) Int. Cl.
*B21C 23/01* (2006.01)
*B21J 5/02* (2006.01)
*B21D 7/00* (2006.01)
*B62K 21/02* (2006.01)
*B21J 5/00* (2006.01)
*B21K 1/74* (2006.01)
*B21C 23/10* (2006.01)
*B21D 41/04* (2006.01)
*B23P 15/00* (2006.01)
*B21C 23/14* (2006.01)

(58) Field of Classification Search
CPC .............. B21J 5/027; Y10T 29/49622; Y10T 29/49616; Y10T 29/49995; Y10T 29/49996
See application file for complete search history.

(56) References Cited

U.S. PATENT DOCUMENTS

| | | | | |
|---|---|---|---|---|
| 3,689,969 A * | 9/1972 | Tsunoda | B21K 1/76 | 219/150 R |
| 4,305,269 A * | 12/1981 | Kimura | B21D 53/86 | 29/421.1 |
| 4,967,584 A * | 11/1990 | Sato | B21K 1/74 | 72/352 |
| 5,011,172 A * | 4/1991 | Bellanca | B62K 19/02 | 264/258 |
| 5,016,895 A * | 5/1991 | Hollingsworth | B62K 21/02 | 264/258 |
| 5,039,470 A * | 8/1991 | Bezin | B62K 19/16 | 264/255 |
| 5,181,732 A * | 1/1993 | Bezin | B62K 19/16 | 280/279 |
| 5,273,301 A * | 12/1993 | Klein | B62K 21/02 | 280/279 |
| 5,653,007 A * | 8/1997 | Boyer | B62K 25/08 | 280/276 |
| 5,692,764 A * | 12/1997 | Klein | B62K 21/02 | 188/DIG. 1 |
| 5,762,352 A * | 6/1998 | Lee | B62K 21/02 | 280/280 |
| 5,803,477 A * | 9/1998 | Reisinger | B62K 3/02 | 280/275 |
| 6,049,982 A * | 4/2000 | Tseng | B21C 37/15 | 280/279 |
| 6,352,276 B1 * | 3/2002 | Hill | B62K 21/02 | 280/279 |
| 6,375,888 B1 * | 4/2002 | Yeh | B29C 43/12 | 264/129 |
| 6,419,250 B1 * | 7/2002 | Pollock | B21K 1/74 | 280/93.512 |
| 6,451,237 B1 * | 9/2002 | Miles | B62K 19/16 | 264/219 |
| D494,108 S * | 8/2004 | Liao | D12/118 | |
| 6,866,280 B2 * | 3/2005 | Chang | B21D 26/037 | 280/281.1 |
| 7,051,564 B2 * | 5/2006 | Chang | B21D 53/86 | 280/281.1 |
| 7,257,981 B2 * | 8/2007 | Natsui | B21J 5/02 | 72/352 |
| 7,413,207 B2 * | 8/2008 | Yu | B62K 21/02 | 280/279 |
| 7,464,950 B2 * | 12/2008 | Schuman | B62K 19/16 | 280/279 |
| 7,621,549 B2 * | 11/2009 | van Houweling | B62J 6/02 | 280/276 |
| 7,900,948 B2 * | 3/2011 | Lewis | B62K 19/22 | 280/276 |
| 8,701,741 B2 * | 4/2014 | Di Serio | B21J 5/00 | 164/132 |
| 9,027,947 B2 * | 5/2015 | Galasso | B62K 21/02 | 280/276 |
| 9,205,482 B2 * | 12/2015 | Chen | B21D 53/86 | |
| 9,334,009 B2 * | 5/2016 | Galasso | B62K 21/02 | |
| 2003/0178808 A1 * | 9/2003 | Chang | B21D 26/037 | 280/281.1 |
| 2004/0093926 A1 * | 5/2004 | Natsui | B21J 5/02 | 72/377 |
| 2004/0130122 A1 * | 7/2004 | Chang | B21D 26/037 | 280/281.1 |
| 2005/0092050 A1 * | 5/2005 | Chang | B21D 53/86 | 72/61 |
| 2008/0036170 A1 * | 2/2008 | Vroomen | B62K 19/04 | 280/279 |
| 2009/0160156 A1 * | 6/2009 | Yu | B21K 21/04 | 280/276 |
| 2009/0160157 A1 * | 6/2009 | Yu | B62K 21/02 | 280/276 |
| 2009/0243251 A1 * | 10/2009 | Galasso | B62K 21/02 | 280/279 |
| 2011/0316249 A1 * | 12/2011 | Thoma | B62K 25/02 | 280/279 |
| 2012/0104725 A1 * | 5/2012 | Yu | B62K 21/04 | 280/281.1 |
| 2015/0266081 A1 * | 9/2015 | Chen | B21D 53/86 | 29/897.2 |

FOREIGN PATENT DOCUMENTS

TW 201425120 A 2/2014
WO WO 9825715 A2 * 6/1998 ............ B21C 23/14
WO WO 9842460 A2 * 10/1998 ............ B21C 23/001

* cited by examiner

METHOD FOR MANUFACTURING BICYCLE FRONT FORK HAVING WHEEL CLAMPING BASE

BACKGROUND OF THE INVENTION

1. Field of the Invention

The present invention relates to a method for manufacturing a bicycle front fork having a wheel clamping base, especially for making an integrally formed bicycle front fork having a clamping base at the front ends of fork tubes.

2. Description of Related Art

Generally, when a bicycle is passing through the rugged road, not only its bicycle front fork but also its clamping base for receiving a wheel axle must sustain much vibration and impact. Therefore, the clamping base of the bicycle front fork usually has a solid structure for enhancing its resistance to vibration and impact. However, bicycle front forks are usually made to have a hollow structure in order to have a decreased weight. In such a case, it is difficult to integrate the clamping base having a solid structure into the bicycle front forks having a hollow structure. For instance, a European Patent No. EP2230165, issued on 22 Sep. 2010, has disclosed a unitary crown fork assembly and method of fabrication, which shows that clamping bases are manufactured at first and then the clamping bases are bonded or welded to the front ends of two fork tubes of a bicycle front fork (page 6, paragraph [0061]). However, in subjected to vibration and impact, the bonding or welding area is prone to broken due to its poor structural strength. Furthermore, the abovementioned method also has disadvantages, i.e. complicated, time-consuming and costly manufacturing procedure, and poor appearance due to having a bonding or welding sign.

SUMMARY OF THE INVENTION

In view of the above-mentioned problems, the object of the present invention is to provide a method for manufacturing a bicycle front fork having a wheel clamping base, especially for making an integrally formed bicycle front fork having a clamping base at the front ends of fork tubes. Moreover, the front side of the fork tubes of the bicycle front fork can be provided with bumps for locking a brake.

To achieve the above object, the present invention was developed based on a Taiwan Patent No. 201425120, which issued on 1 Jul. 2014 and disclosed a manufacturing method for integrally formed bicycle fork made of aluminum alloy.

DETAILED DESCRIPTION OF THE PREFERRED EMBODIMENT

Figure 1:
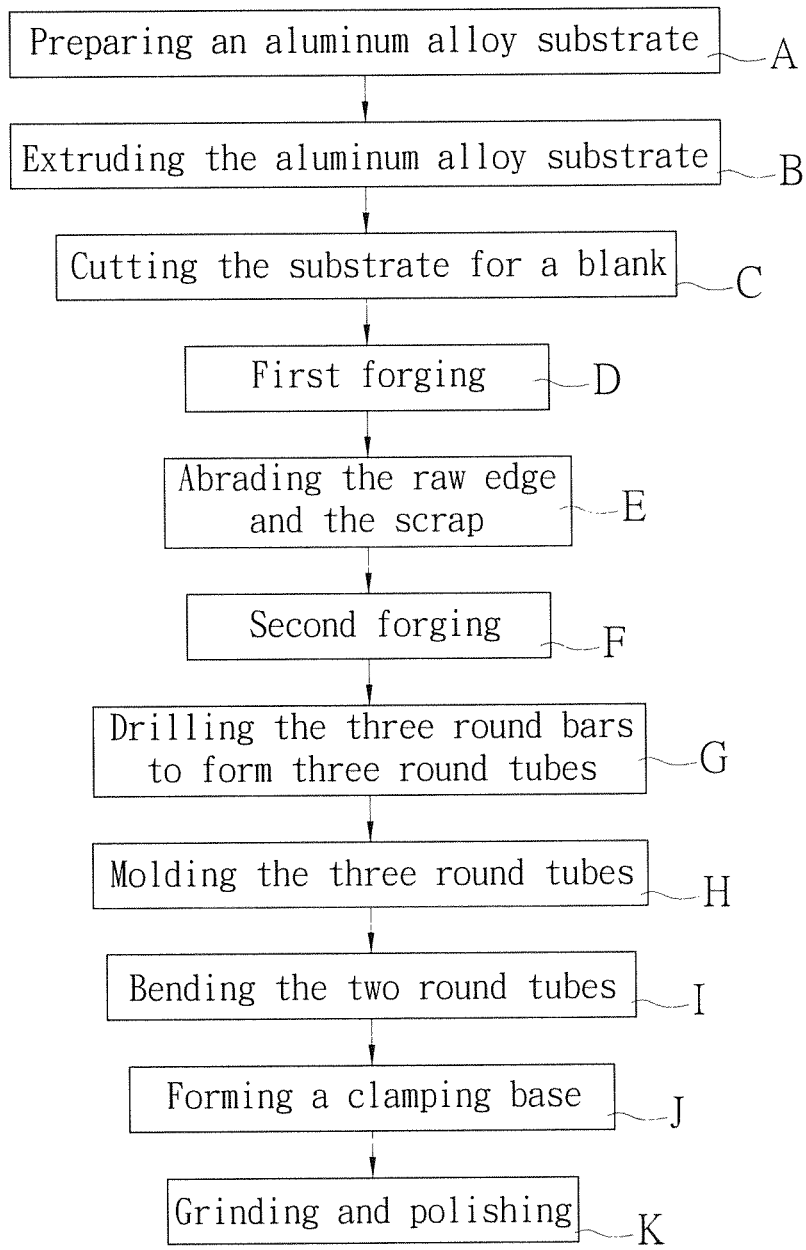
FIG. 1 is a flow chart of a first embodiment of the present invention.
Figure 2:
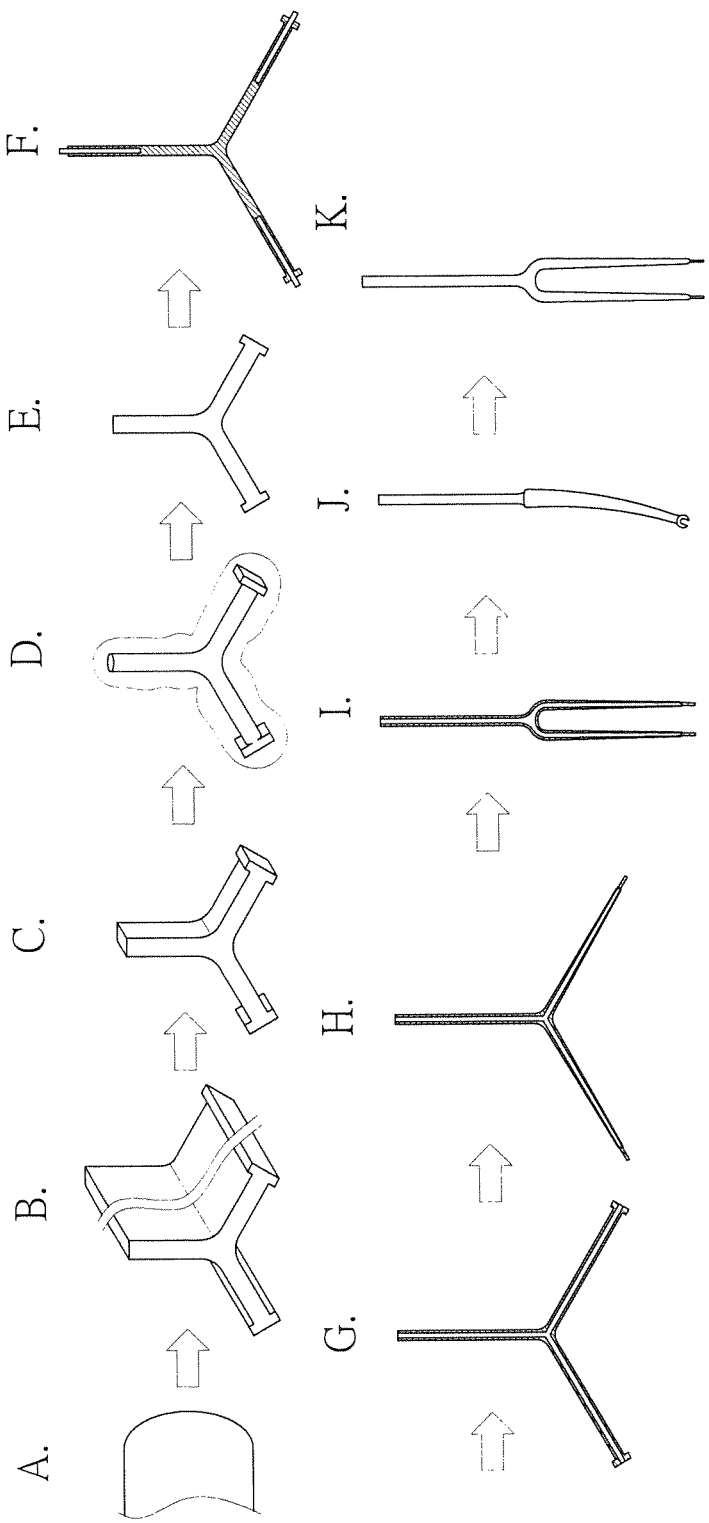
FIG. 2 is a schematic drawing showing the first embodiment of the present invention.

Hereinafter, an exemplary embodiment of the present invention will be described in detail with reference to the accompanying drawings. Referring to FIG. 1 and FIG. 2, a flow chart and a schematic drawing showing the first embodiment of the present invention are revealed. A method for manufacturing an integrally formed bicycle front fork having a wheel clamping base comprises the steps of:

A. preparing an aluminum alloy substrate having an appropriate length;

B. extruding the aluminum alloy substrate to have three rectangular bars integrally connected in a radical orientation, wherein two of the three rectangular bars has a first side and a second side on the front end thereof, and the first side or both of the first side and the second side connect to assembling segments; preferably both of the first side and the second side of each of the two rectangular bars are provided with a assembling segment;

C. cutting the substrate for a blank having an appropriate length;

D. placing the blank into a first mold for forging the three rectangular bars into three round bars and stamping a raw edge and a scrap of the blank;

E. abrading the raw edge and the scrap of the blank;

F. placing the blank into a second mold for extruding and punching front ends of the three round bars of the blank to have guide holes;

G. drilling the three round bars along the guide holes to form three round tubes communicated with one another;

H. flattening and shrinking openings of two of the three round tubes, and molding the assembling segments to connectedly extend from the front ends of the two round tubes in parallel;

I. downwardly bending the two round tubes having the assembling segments to space apart from each other in parallel for two fork tubes of a bicycle front fork and allowing the other round tube to form a vertical tube of the front fork;

J. punching the assembling segments at the front ends of the two fork tubes into locking connection portions for a clamping base of the bicycle front fork; and K. grinding and polishing a surface of the bicycle front fork to form a finished product having a polishing and flawless appearance.

Figure 3:
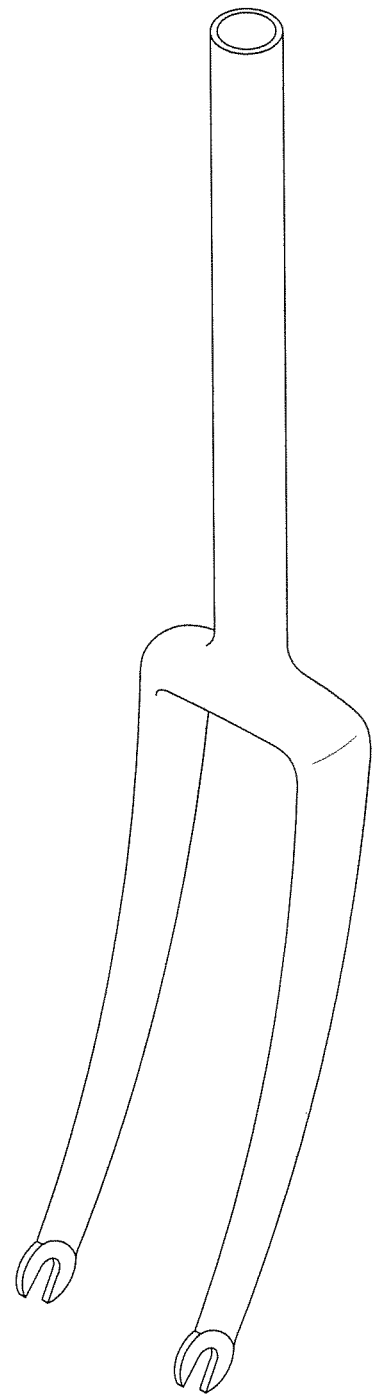
FIG. 3 is a stereogram showing a finished product of the first embodiment of the present invention.

Accordingly, a bicycle front fork having a clamping base for receiving a wheel axle is integrally formed without bonding or welding as shown in FIG. 3. Because the bicycle front fork having a clamping base of the present invention has a solid structure, it can withstand a relatively large and frequent vibration and impact. In such a case, the present invention prevent the disadvantages, i.e. complicated, time-consuming and costly manufacturing procedure, and poor appearance, due to having a bonding or welding sign, of the traditional method.

Figure 4:
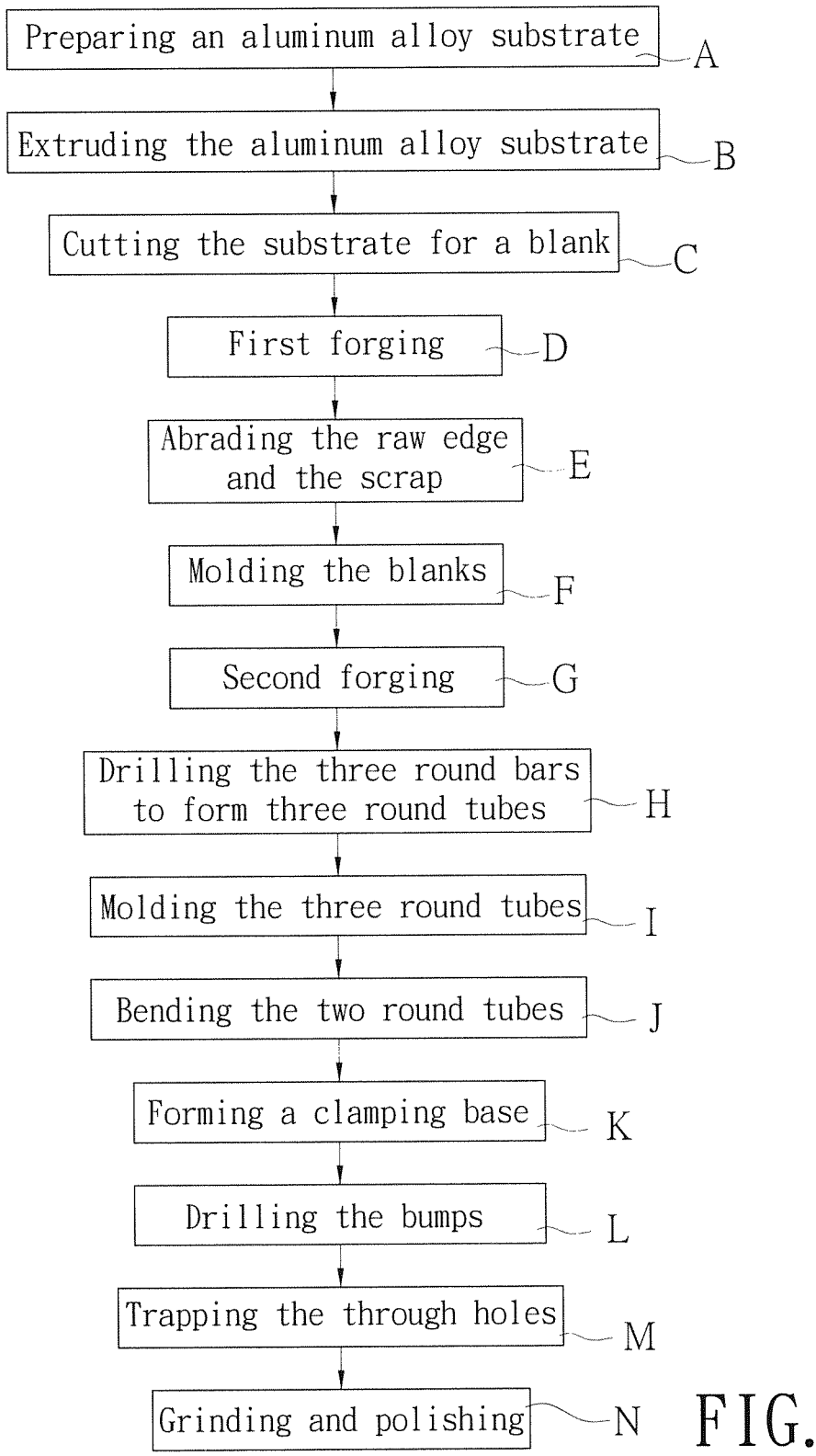
FIG. 4 is a flow chart of a second embodiment of the present invention.
Figure 5:
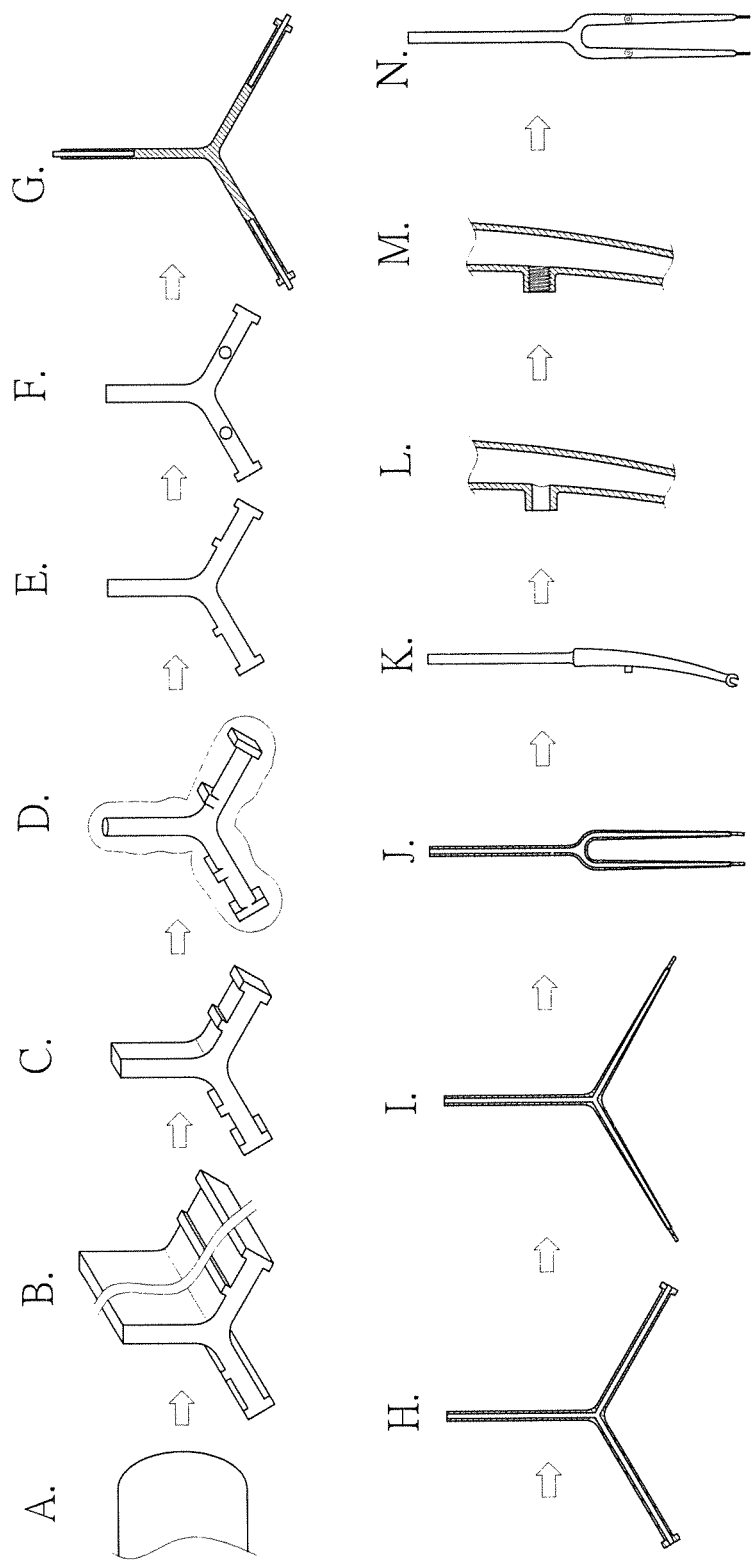
FIG. 5 is a schematic drawing showing the second embodiment of the present invention.

Referring to FIG. 4 and FIG. 5, a flow chart and a schematic drawing showing the second embodiment of the present invention are revealed. A method for manufacturing a bicycle front fork having a bump on a lateral of each of the two round bars comprises the steps of:

A. preparing an aluminum alloy substrate having an appropriate length;

B. extruding the aluminum alloy substrate to have three rectangular bars integrally connected in a radical orientation, wherein two of the three rectangular bars has a first side and a second side on the front end thereof, and the first side or both of the first side and the second side connect to assembling segments; preferably both of the first side and the second side of each of the two rectangular bars are provided with a assembling segment, and a lateral of the each of the two rectangular bars are provided with a bump;

C. cutting the substrate for a blank having an appropriate length;

D. placing the blank into a first mold for forging the three rectangular bars into three round bars and stamping a raw edge and a scrap of the blank;

E. abrading the raw edge and the scrap of the blank;

F. flattening and molding the bump on each of the two round bars of the blank to bend the same at a 90-degree angle, allowing the bump from the lateral to a front of each of the two round bars;

G. placing the blank into a second mold for extruding and punching front ends of the three round bars of the blank to have guide holes;

H. drilling the three round bars along the guide holes to form three round tubes communicated with one another;

I. flattening and shrinking openings of two of the three round tubes, and molding the assembling segments to connectedly extend from the front ends of the two round tubes in parallel;

J. downwardly bending the two round tubes having the assembling segments to space apart from each other in parallel for two fork tubes of a bicycle front fork and allowing the other round tube to form a vertical tube of the bicycle front fork;

K. punching the assembling segments at the front ends of the two fork tubes into locking connection portions for a clamping base of the bicycle front fork;

L. drilling the bumps on the two fork tubes to have through holes;

M. trapping the through holes on the bumps of the two fork tubes to have a thread section on a wall of each of the through holes; and finally N. grinding and polishing a surface of the bicycle front fork to form a finished product having a polishing and flawless appearance.

Figure 6:
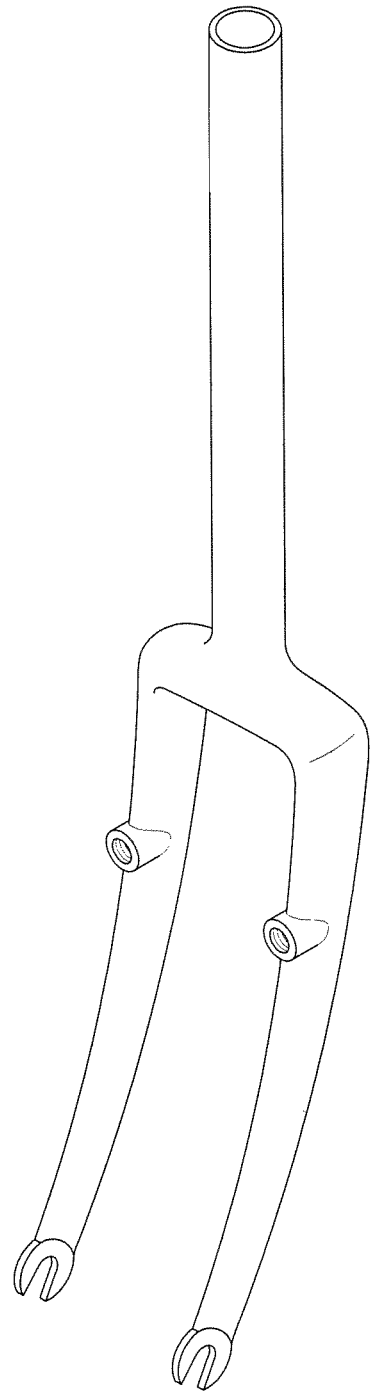
FIG. 6 is a stereogram showing a finished product of the second embodiment of the present invention.

Accordingly, as shown in FIG. 6, the fork tubes of the bicycle front fork have integrally formed bumps on the front for locking a brake without bonding or welding, so the bicycle front fork can withstand a relatively large and frequent vibration and impact. In such a case, the present method prevent the disadvantages, i.e. complicated, time-consuming and costly manufacturing procedure, and poor appearance due to having a bonding or welding sign, of the traditional method.

Figure 7:
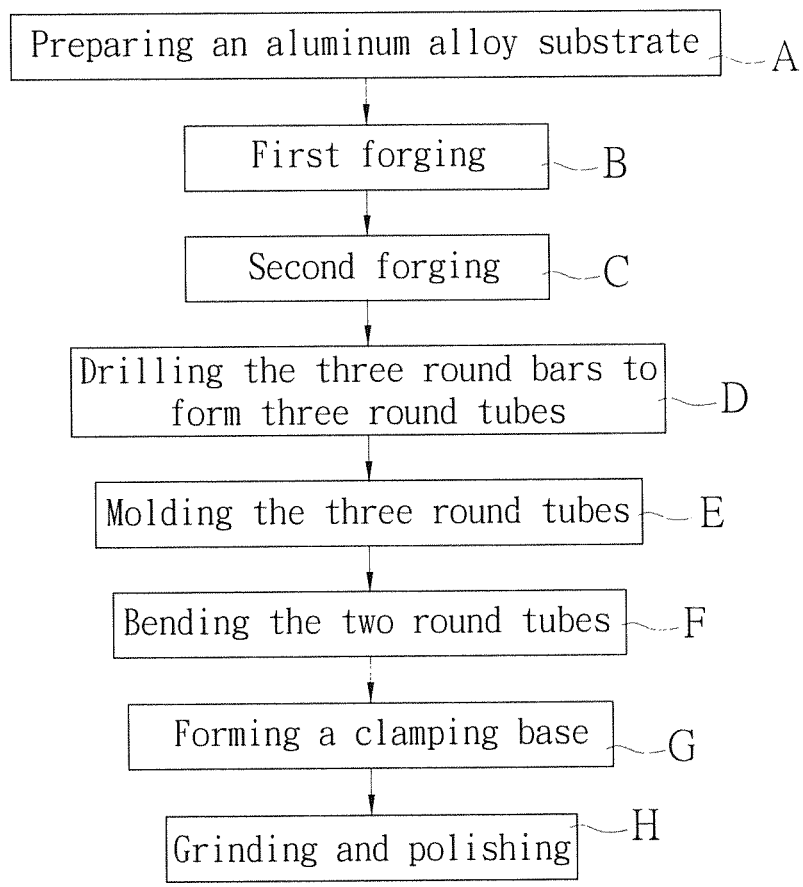
FIG. 7 is a flow chart of a third embodiment of the present invention.
Figure 8:
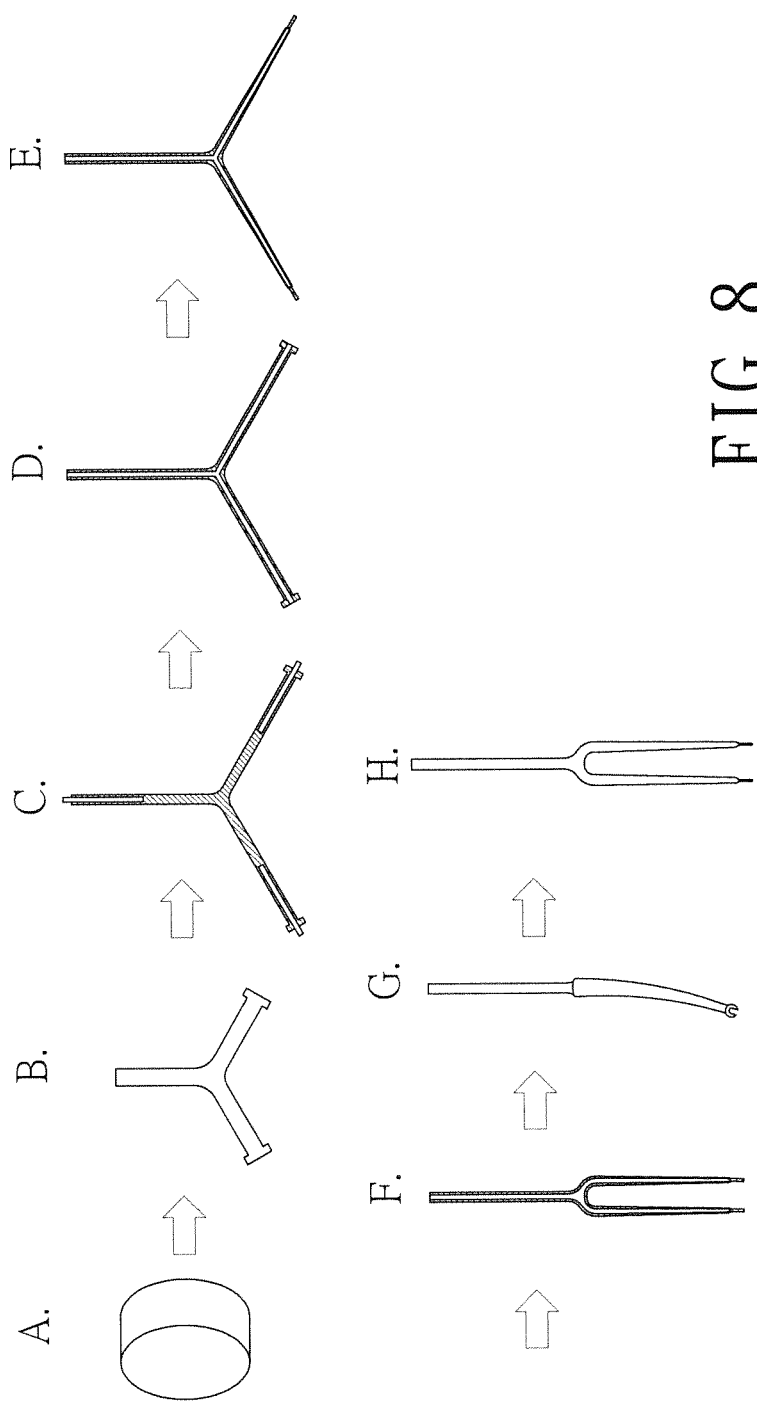
FIG. 8 is a schematic drawing showing the third embodiment of the present invention.

Referring to FIG. 7 and FIG. 8, a flow chart and a schematic drawing showing the third embodiment of the present invention are revealed. A simple method for manufacturing an integrally formed bicycle front fork having a wheel clamping base comprising the steps of:

A. preparing an aluminum alloy substrate consistent with a size and a volume of a finished product;

B. placing the aluminum alloy substrate into a first mold to be forged and formed into a blank having three round bars integrally connected in a radical orientation, wherein two of the three round bars has a first side and a second side on the front end thereof, and the first side or both of the first side and the second side connect to assembling segments; preferably both of the first side and the second side of each of the two round bars are provided with a assembling segment;

C. placing the blank into a second mold for extruding and punching front ends of the three round bars of the blank to have guide holes;

D. drilling the three round bars along the guide holes to form three round tubes communicated with one another;

E. flattening and shrinking openings of two of the three round tubes, and molding the assembling segments to connectedly extend from the front ends of the two round tubes in parallel;

F. downwardly bending the two round tubes having the assembling segments to space apart from each other in parallel for two fork tubes of a bicycle front fork and allowing the other round tube to form a vertical tube of the bicycle front fork;

G. punching the assembling segments at the front ends of the two fork tubes into locking connection portions for a clamping base of the bicycle front fork; and H. grinding and polishing a surface of the bicycle front fork to form a finished product having a polishing and flawless appearance.

Accordingly, the simple method can make an integrally formed bicycle front fork having a wheel clamping base at the front ends of the fork tubes for receiving a wheel axle.

Figure 9:
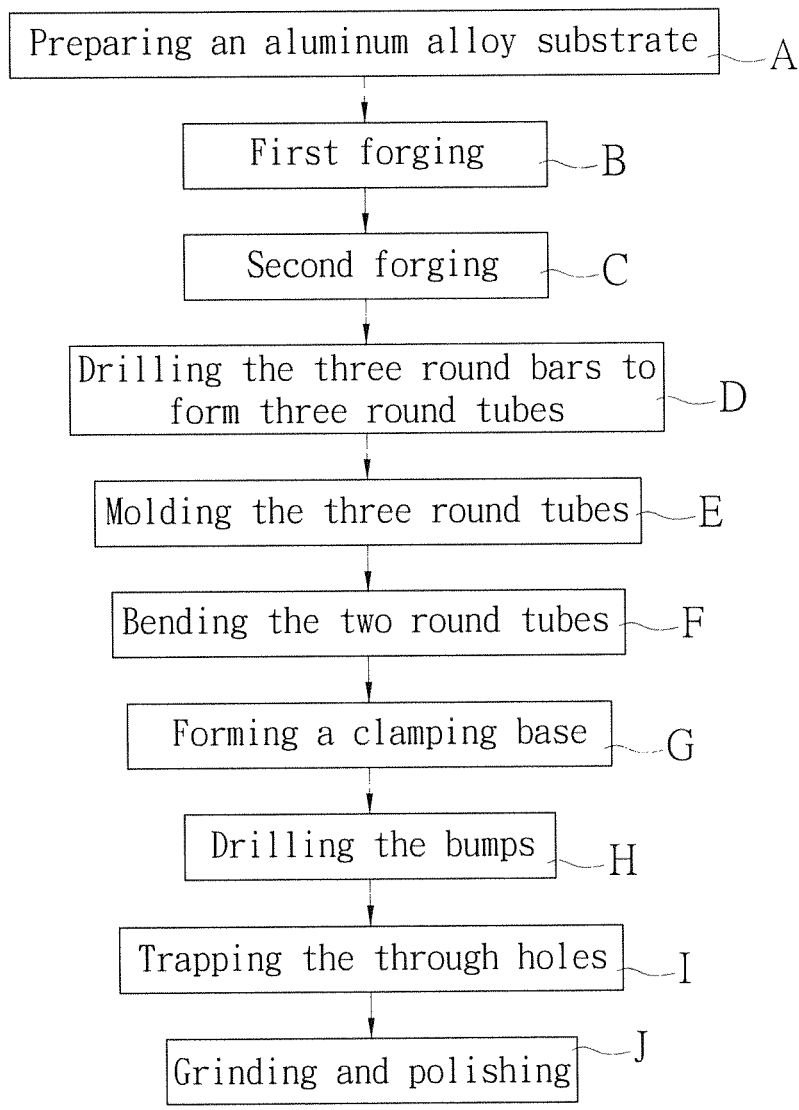
FIG. 9 is a flow chart of a fourth embodiment of the present invention.
Figure 10:
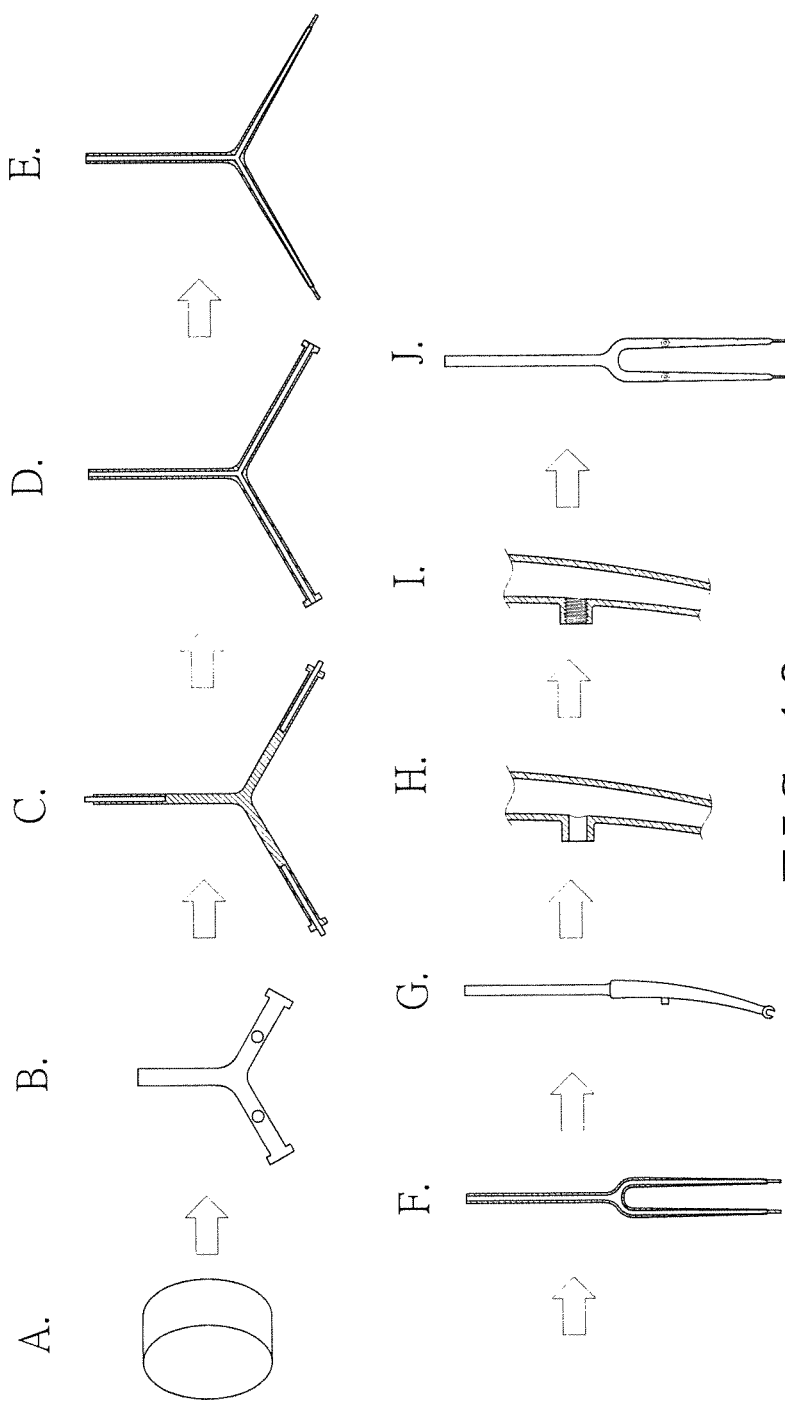
FIG. 10 is a schematic drawing showing the fourth embodiment of the present invention.

Referring to FIG. 9 and FIG. 10, a flow chart and a schematic drawing showing the fourth embodiment of the present invention are revealed. A method for manufacturing bicycle front fork having an integrally formed wheel clamping base and integrally formed bumps on the front of the fork tubes for locking a brake comprises the steps of:

A. preparing an aluminum alloy substrate consistent with a size and a volume of a finished product;

B. placing the aluminum alloy substrate into a first mold to be forged and formed into a blank having three round bars integrally connected in a radical orientation, wherein two of the three round bars has a first side and a second side on the front end thereof, and the first side or both of the first side and the second side connect to assembling segments; preferably both of the first side and the second side of each of the two round bars are provided with a assembling segment, and a lateral of the each of the two rectangular bars are provided with a bump;

C. placing the blank into a second mold for extruding and punching front ends of the three round bars of the blank to have guide holes;

D. drilling the three round bars along the guide holes to form three round tubes communicated with one another;

E. flattening and shrinking openings of two of the three round tubes, and molding the assembling segments to connectedly extend from the front ends of the two round tubes in parallel;

F. downwardly bending the two round tubes having the assembling segments to space apart from each other in parallel for two fork tubes of a bicycle front fork and allowing the other round tube to form a vertical tube of the bicycle front fork;

G. punching the assembling segments at the front ends of the two fork tubes into locking connection portions for a clamping base of the bicycle front fork;

H. drilling the bumps on the two fork tubes to have through holes;

I. trapping the through holes on the bumps of the two fork tubes to have a thread section on a wall of each of the through holes; and finally J. grinding and polishing a surface of the bicycle front fork to form a finished product having a polishing and flawless appearance.

Accordingly, the bicycle front fork has integrally formed bumps on the front of the fork tubes of the bicycle front fork for locking a brake effectively.

It is worth mentioning that the steps of drilling the bumps as well as trapping the through holes can be conducted after the step of bending the two round tubes and before the step of forming a clamping base.

What is claimed is:

1. A method for manufacturing a bicycle front fork having a wheel clamping base, comprising the steps of:
    A. preparing an aluminum alloy substrate;
    B. extruding the aluminum alloy substrate to have three rectangular bars integrally connected in a radical orientation, wherein two of the three rectangular bars have a first side and a second side on front ends thereof, and the first side or both of the first side and the second side connect to assembling segments;
    C. cutting the extruded substrate for a blank;
    D. placing the blank into a first mold for forging the three rectangular bars into three round bars and stamping a raw edge and a scrap of the blank;
    E. abrading the raw edge and the scrap of the forged blank;
    F. placing the forged blank into a second mold for extruding and punching front ends of the three round bars of the blank to have guide holes;
    G. drilling the three round bars along the guide holes to form three round tubes communicated with one another;
    H. flattening and shrinking openings of two of the three drilled round tubes, and molding the assembling segments to connectedly extend in parallel from the front ends of the two round tubes with the flattened and shrunk openings;
    I. downwardly bending the two round tubes having the assembling segments to space apart from each other in parallel for two fork tubes of a bicycle front fork and allowing the other round tube to form a vertical tube of the bicycle front fork; and
    J. punching the assembling segments at the front ends of the two fork tubes into locking connection portions for a clamping base of the bicycle front fork.

2. The method of claim 1, wherein each of the two rectangular bars having the assembling segments in step B further has a bump on a lateral thereof, and a step for flattening and molding the bump on each of the two round bars of the blank to bend the same from the lateral to a front of each of the two round bars is conducted before step F.

3. The method of claim 2, wherein the method further comprises a step that the bumps are drilled to have through holes after the two round bars having the bumps are formed into the two round tubes in step G and the two round tubes are bended to form the two fork tubes in step I.

4. The method of claim 3, wherein the method further comprises a step of trapping the through holes on the bumps of the two fork tubes to have a thread section on a wall of each of the through holes.

5. The method of claim 1, wherein the method further comprises a final step of grinding and polishing a surface of the bicycle front fork.

6. A method for manufacturing a bicycle front fork having a wheel clamping base, comprising the steps of:
    A. preparing an aluminum alloy substrate;
    B. placing the aluminum alloy substrate into a first mold to be forged and formed into a blank having three round bars integrally connected in a radical orientation, wherein two of the three round bars have a first side and a second side on front ends thereof, and the first side or both of the first side and the second side connect to assembling segments;
    C. placing the forged blank into a second mold for extruding and punching front ends of the three round bars of the blank to have guide holes;
    D. drilling the three round bars along the guide holes to form three round tubes communicated with one another;
    E. flattening and shrinking openings of two of the three drilled round tubes, and molding the assembling segments to connectedly extend in parallel from the front ends of the two round tubes with the flattened and shrunk openings;
    F. downwardly bending the two round tubes having the assembling segments to space apart from each other in parallel for two fork tubes of a bicycle front fork and allowing the other round tube to form a vertical tube of the bicycle front fork; and
    G. punching the assembling segments at the front ends of the two fork tubes into locking connection portions for a clamping base of the bicycle front fork.

7. The method of claim 6, wherein each of the two round bars having the assembling segments in step B further has a bump at a front thereof.

8. The method of claim 7, wherein the method further comprises a step that the bumps are drilled to have through holes after the two round bars having the bumps are formed into the two round tubes in step D and the two round tubes are bended to form the two fork tubes in step F.

9. The method of claim 8, wherein the method further comprises a step of trapping the through holes on the bumps of the two fork tubes to have a thread section on a wall of each of the through holes.

10. The method of claim 6, wherein the method further comprises a final step of grinding and polishing a surface of the bicycle front fork.

* * * * *